Nov. 12, 1957 H. J. BICHSEL 2,813,193
ARC WELDING
Filed Nov. 30, 1955 3 Sheets-Sheet 1
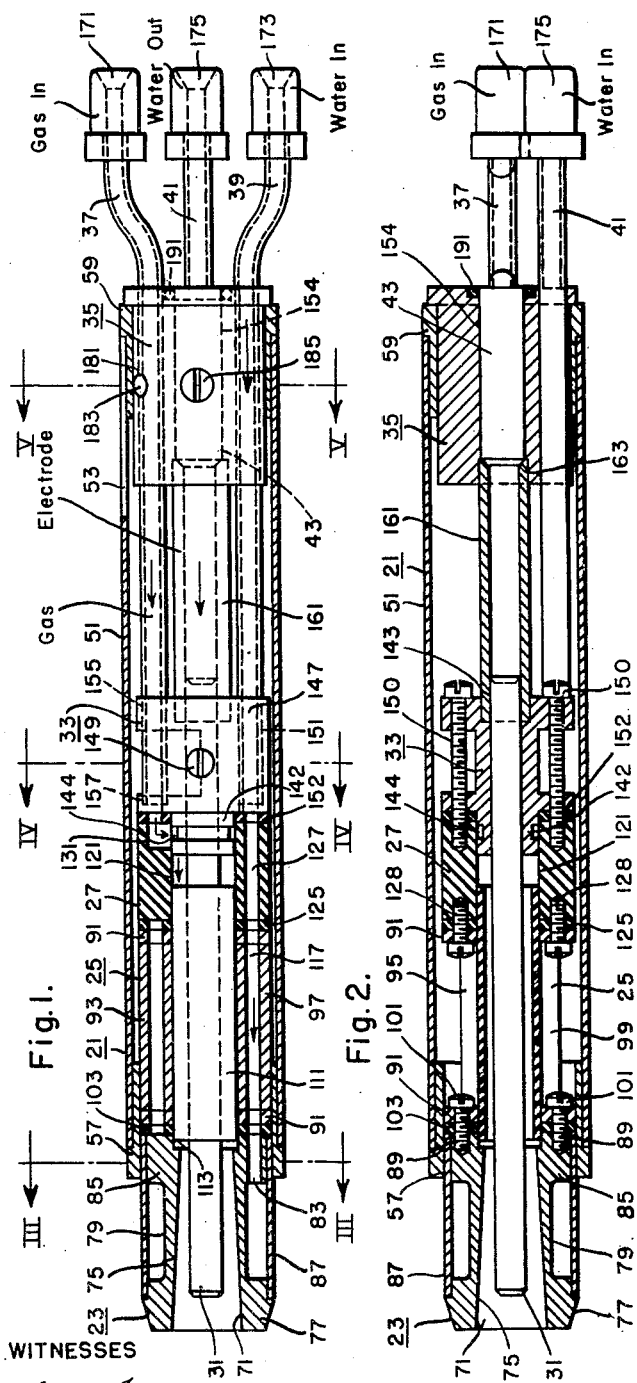
INVENTOR
Harry J. Bichsel.

Nov. 12, 1957  H. J. BICHSEL  2,813,193
ARC WELDING
Filed Nov. 30, 1955  3 Sheets-Sheet 2
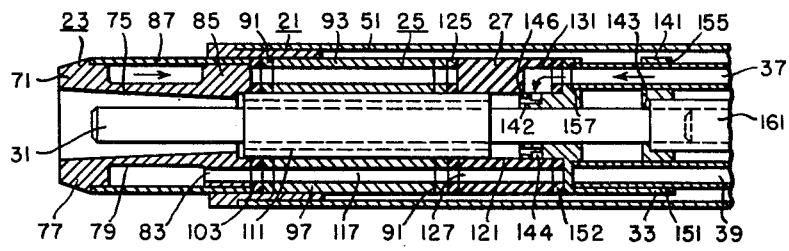
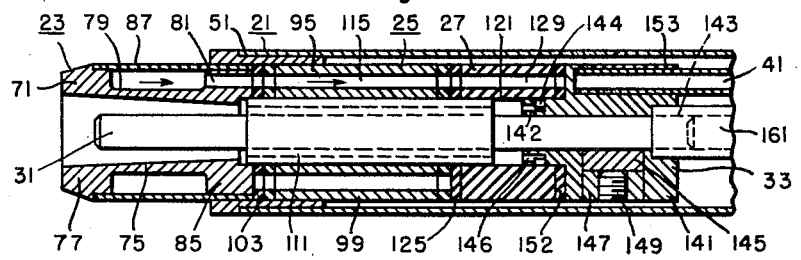
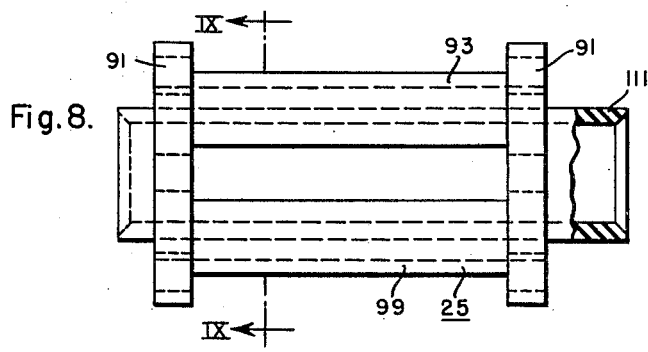
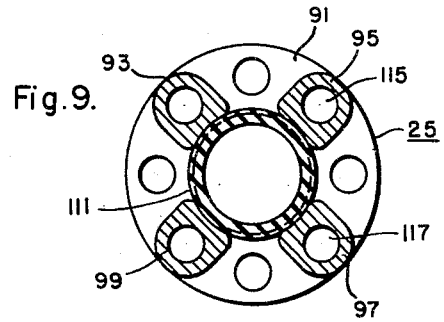

United States Patent Office 2,813,193
Patented Nov. 12, 1957

2,813,193
ARC WELDING

Harry J. Bichsel, East Aurora, N. Y., assignor to Westinghouse Electric Corporation, East Pittsburgh, Pa., a corporation of Pennsylvania Application November 30, 1955, Serial No. 550,106

4 Claims. (Cl. 219—130)

This application relates to welding apparatus and has particular relation to welding guns or torches.

In its principal aspect, this invention concerns itself with a gun or torch for welding with a consumable electrode in an atmosphere of shielding gas such as mixtures of carbon dioxide, argon or helium, or these gases alone. A gun of this general type suitable for welding by hand is disclosed in an application Serial No. 465,508, filed October 29, 1954, to Joseph F. Miller. It is desirable that a gun of the general type disclosed in the Miller application be provided for automatic welding, and it is an object of this invention to provide such a gun or torch.

While the gun disclosed in the Miller application is on the whole satisfactory, difficulty has been encountered in situations in which this gun was subjected to heavy use. Under such circumstances, it has been found that the cooling fluid which is usually water tends to leak out through the nozzle.

It is, accordingly, a specific object of this invention to provide a gun or torch similar to the Miller gun which shall not develop cooling fluid leaks when subjected to hard use.

In accordance with this invention, a gun or torch for automatic welding is provided which includes a generally cylindrical housing from one end of which the nozzle extends, and at the other end of which there are provisions for conveying cooling fluid to and away from the nozzle and gas through the nozzle and for passing the electrode through the nozzle. The gun includes a guide tube for the electrode which extends into the nozzle. This guide tube is supported from a header which may be called the inner header by means of a set screw, a pin, or the like. When the guide tube is damaged by burning, for example, it may be readily removed by releasing the set screw and pulling the guide tube out with a tool inserted through the nozzle. The header, the barrel and the nozzle are provided with communicating channels for transmitting the shielding gas through the nozzle and for conveying the cooling fluid to and away from the nozzle. The torch in accrdance with this invention is also provided with a second or rear header in the form of a cylindrical block having a central opening and a plurality of peripheral openings. A bushing for guiding the electrode is in the central opening and a plurality of tubes for conveying gas and water extend through the peripheral openings. The outer header is mounted near the end of the barrel remote from the nozzle in such a way that the bushing is coextensive and communicates with the guide tube through another bushing, and the gas and cooling fluid tubes are coextensive and communicate with the channels in the inner header through which the gas and cooling fluid is conveyed. The torch or gun thus provided is of simple structure and lends itself readily to automatic welding in a shielding gas with a consumable electrode.

The specific aspect of this invention involving the elimination of the cooling fluid leaks in the Miller gun arises from the discovery that the leaks are caused by the bridging by particles of metal of the gap between the guide tube and the extension laterally adjacent the guide tube within the barrel through which the cooling fluid flows. These particles are, in the use of the Miller gun, projected from the weld puddle into the nozzle. Subsequently, when the gun is held with its nozzle opening upward so that it may be cleaned, the particles slide into the space between the guide tube and the extension and bridge this gap. When a potential is impressed between the guide tube and the spacer, these particles become short circuits, and the heavy current which flows through them tend to puncture the extension causing the fluid to leakout.

In accordance with the specific aspects of this invention, a tube of insulating material such as melamine, for example, is interposed between the extension and the guide tube. The presence of bridging particles between this insulating tube and the guide tube does not then result in short circuit currents flowing through the particles and the puncturing of the extension. The insulator tube is shown herein as used with an automatic welding torch or gun; a similar insulator tube may be provided between the extension and the guide tube of the Miller gun and such use is within the scope of this invention. It has been found in using the gun disclosed herein and the gun like the Miller gun with the insulator tube interposed between the guide tube and the spacer that the leaks are eliminated.

The novel features considered characteristic of this invention are discussed generally above. The invention itself, both as to its organization and its method of operation, together with additional objects and advantages thereof will be understood from the following description of a specific embodiment when read in connection with the accompanying drawings in which:

Figure 1 is a view in longitudinal section of a torch or gun for automatic welding in accordance with this invention;

Fig. 2 is a view in longitudinal section of the torch taken along a plane different from the plane of Fig. 1;

Fig. 3 is a view in transverse section taken along the line III—III of Fig. 1;

Fig. 4 is a view in transverse section taken along the line IV—IV of Fig. 1;

Fig. 5 is a view in transverse section taken along the line V—V of Fig. 1;

Fig. 6 is a view in longitudinal section taken along the line VI—VI of Fig. 4;

Fig. 7 is a view in longitudinal section taken along the line VII—VII of Fig. 4;

Fig. 8 is a view in elevation of the extension in the gun in accordance with this invention;

Fig. 9 is a view in transverse section taken along line IX—IX of Fig. 8;

Figure 10:
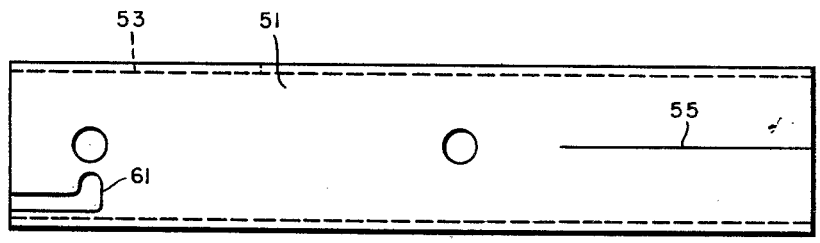
Fig. 10 is a view in side elevation of the housing of the gun in accordance with this invention.
Figure 11:
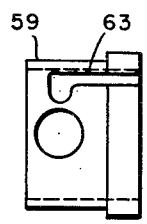
Figs. 11 and 12 are respectively views in side elevation of bushings for holding the housings.
Figure 12:
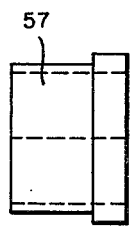

The gun or torch shown in the drawings includes a cylindrical housing assembly 21, a nozzle assembly 23, a conducting extension 25, an insulating spacer 27, an electrode guide tube 31, a header 33 for holding the electrode guide tube, and an outer header 35 within which the tubes 37, 39 and 41 for conveying the gas and cooling fluid and a guide bushing 43 for the electrode (not shown) are mounted.

The housing assembly 21 includes a cylindrical shell 51 having slits 53 and 55 at its ends resiliently mounted on bushings 57 and 59 at each of its ends with the edges of the shell 51 engaging shoulders in the bushings. The shell is provided with a knee-shaped slot 61 which is coincident with the similar slot 63 in the bushing 59. The shell 51 fits tightly on the bushings 57 and 59 with the slots 61 and 63 coincident. The shell 51 and bushings 57 and 59 may be composed of brass or of an insulator such as melamine.

The nozzle assembly 23 includes a hollow block 71 having a tapered opening 75 and a tapered tip 77. The block is provided with a groove 79 extending around a portion of its periphery and has openings 81 and 83 through a shoulder 85 adjacent the groove which communicates with the groove. The openings 81 and 83 are displaced by an angle of approximately 90 degrees about the center of the block 71 (see Fig. 3). The groove 79 in the block is enclosed in a shell 87 which is slipped on the end of the block remote from the tapered tip 71 and engages a shoulder extending from the tip. The groove 79 and shell 87 thus provide a hollow cavity within the block which is in communication with the openings 81 and 83 in the adjacent shoulders. The shoulder 85 has a plurality of threaded openings 89 by means of which it may be secured to the remainder of the gun. The nozzle assembly 23 is preferably made of cupaloy alloy No. 7550-6 but copper may also be used.

The extension 25 is a hollow generally cylindrical body preferably composed of cast bronze and having ears 91 at its ends and having hollow projections 93, 95, 97 and 99 extending from the center. The extension 25 is secured to the nozzle assembly by bolts 101 which pass through the ears 91 and engage the thread 89 in the nozzle assembly. A gasket 103, preferably of asbestos, is interposed between the ears 91 on the extension 25 and the end of the nozzle assembly 23. A tube 111 of insulation material, such as melamine, is pressed into the extension. The insulator tube 111 extends beyond the end of the extension and engages an internal shoulder 113 on the nozzle block 71. The openings 115 and 117 in two of the projections 95 and 97 are coextensive with the openings 81 and 83 in the shoulder 85 of the nozzle block 71 and, thus, communicate with the cavity 79—87 in the block.

The spacer 27 may be composed of nylon; it is of generally cylindrical form and has a central opening 121. The spacer 27 is secured to the extension by bolts 128 which pass through the ears 91. The opening 121 is coextensive with the opening in the extension 25. The gasket 125 is provided between the insulating spacer 27 and the ears 91 of the extension to which it is secured. The insulator tube 111 extends beyond the end of the extension 25 into the insulating spacer 27. The spacer 27 is also provided with longitudinal openings 127 and 129 which are in communication with the openings 115 and 117 in the extension 25 and, thus, communicate with the cavity 79—87 within the nozzle 23. The spacer 27 is further provided with an internal groove 131 communicating with the region at its center (see Fig. 6).

The header 33 which holds the guide tube is in the form of a hollow cylinder with a portion 141 (Fig. 4) in the center cut away to an angle of the order of 180 degrees, having a stem 142 with a groove 144. The extreme portion of the stem 142 bounding the groove 144 has longitudinal openings 146 therein. The guide tube 31 slides into the opening 143 in the center of the header with its surface extending through the opening. It is held by a jaw-like block 145 which compressed the guide tube 31 between the jaw 145 and the header 33. A jaw housing 147 is provided for the clamping jaw 145 and the jaw 145 is urged into engagement with the guide tube 31 by a set screw 149 screwed into the housing 147. The header 33 is secured to the insulating spacer 27, with the stem 142 engaging the wall of the opening 121 in the spacer and the groove 131 communicating with the groove 144, by bolts 159 extending through the header and screwed in the spacer (see Fig. 2). A gasket 152 is provided between the header 33 and the spacer 27. The header 33 is provided with openings 151 and 153 which are coextensive with the openings 127 and 129 in the insulating spacer 27 and, thus, communicate with the cavity 79—87 in the nozzle 21. The sides of the header adjacent the portion 141 opening are also provided with openings 155 and 157 which communicate with the groove 131 in the insulating spacer 27 (see Fig. 1). The groove 144 in the stem 142 is in communication with the slot 131 in the insulating spacer 27 which communicates with the nozzle through the openings 146. The openings 155 and 157 in the header 33 are thus in communication with the space between the insulator tube 111 and the guide tube 31 and the nozzle 23. The guide tube 31 is composed of copper, and the header 33 is preferably of cupaloy alloy No. 7550-6 but may also be of copper.

The outer or rear header 35 is composed of cupaloy alloy No. 7550-6 or copper and is in the form of a hollow cylindrical block having a shoulder. This header 35 has a central opening 154 and a plurality of peripheral openings 156, 158, 160. A brass bushing 161 extends between and communicates with the bushing 43 in the header 35 and the opening 143 in the inner header 33. The guide tube 31 extends a short distance within the bushing 161 and thus communicates with bushing 43 through the bushing 161. The bushing 43 is tapered at its joint 163 with the guide tube 37. The tubes 37, 39 and 41 for conducting shielding gas and for transmitting water to and away from the nozzle are mounted in the peripheral openings 156, 158 and 160. Each of the tubes is provided with a suitable fitting 171, 173 and 175.

The gas tube 37 passes through openings 155 and 157 in the header 33 and thus communicates with the region between the guide tube 31 and the nozzle 23, and the groove 131 in the insulating spacer 27. The water inlet and the water outlet tubes 39 and 41 each pass through an opening 151 and 153 in the header 33 communicating with the cavity 79—87 in the nozzle so that cooling fluid may flow toward and away from the nozzle.

The header 35 is provided with a transverse opening 181 in one side of which a pin 183 is inserted. This pin engages the knee-shaped slots 61 and 63 in the shell 51, and in the bushing 59. The rear header 35 also has a radial opening into which a set screw 185 for holding the bushing 43 screws.

In the assembly of the gun, the manifold assembly including the inner header 33, the rear header 35, the tubes 37, 39, 41 and the bushings 161 and 43, is formed into a rigid unit. For this purpose, the bushing 43 is slipped into the opening 154 secured by set screw 185 and is sealed gas tight by an O-ring seal 191. The tubes 37, 39 and 41 are then slipped through the openings 156, 158, 160 in the header 35 and the openings 151, 153, 155 and 157 and the header 33 and the headers 33 and 35 are slipped over the ends of bushing 161. The tubes 37, 39, 41 and the bushing 161 are then brazed to the headers 33 and 35 at their junctions with the headers. An opening 201 is then drilled through the header 35, the gas tube 37 and the bushing 43 and a plug 203 is sealed gas tight in the opening in the header 35 between the tube 37 and its outer surface, so that gas may be bled from the tube 37 into the bushing 43. The nozzle 23, extension 25 and insulator tube 111, spacer 27 and manifold assembly are then bolted together, the electrode guide 31 is slipped through the header 33 into the bushing 161 and is secured by screw 149 and the housing 21 is slipped over the unit and locked at pin 183.

In the use of the apparatus, the gun is mounted on an automatic machine. Cooling fluid conductors and gas conductors (not shown) are connected to fittings 175, 173 and 171. A guide cable (not shown) is inserted in the electrode bushing 43 with an O-ring (not shown) between the shoulder of the guide cable and the adjacent wall of the header 35. With the parts so mounted, an electrode is threaded into the gun so that it projects through the guide tube 31 into the nozzle.

In operation, an arc is fired between the electrode and the work and shielding gas and cooling fluid are supplied to the various tubes. The welding is then carried out under the protection of the shielding gas and the nozzle 23 is cooled by the cooling fluid supplied thereto. Particles of metal projected from the arc may adhere to the interior surface of the nozzle 23, but these do not affect the welding operation. If such particles find their way into the region between the guide tube 31 and the insulating tube 111, they do not produce short circuits because of the insulating tube.

The gas bled into the bushing 43 builds up back pressure in this bushing and prevents air from being sucked into the gas shield through the bushing 43. The disclosure of this feature in this application is not intended to waive any rights to the invention which it incorporates. This invention is being claimed in an application Serial No. 574,172, filed March 27, 1956, to George H. Cotter and assigned to Westinghouse Electric Corporation.

While a preferred embodiment of this invention has been disclosed herein, many modifications thereof are feasible. The invention, therefore, is not to be restricted except insofar as is necessitated by the prior art and by the spirit of the appended claims.

I claim as my invention:

1. An arc welding gun for welding with a consumable electrode having a barrel terminating in a gas nozzle, said barrel including fluid channels for transmitting cooling fluid to, and away from said nozzle, and a gas channel for transmitting a shielding gas through said nozzle and a tube within said barrel extending into said nozzle for guiding said electrode through said barrel, said tube being held in said barrel by a set screw or the like at a point of said barrel displaced from said nozzle, said tube being removable through said nozzle on release of said set screw, the said gun being characterized by a tube of insulating material within said barrel around said guiding tube.

2. An arc welding gun for welding with a consumable electrode having a barrel terminating in a gas nozzle, said barrel including fluid channels for transmitting cooling fluid to and away from said nozzle, a gas channel for transmitting a shielding gas through said nozzle and a tube within said barrel extending into said nozzle for guiding said electrode through said barrel, said tube being held in said barrel by a set screw or the like at a point of said barrel displaced from said nozzle, said tube being removable through said nozzle on release of said set screw, the said gun being characterized by a tube of insulating material within said barrel around said guiding tube, said insulating tube extending between said nozzle and the point where said guiding tube is held.

3. An arc welding gun for welding with a consumable electrode having a barrel terminating in a gas nozzle and including a header and an extension tube, said extension tube being interposed between said header and said nozzle, said barrel also including fluid channels for transmitting cooling fluid to and away from said nozzle, a gas channel for transmitting a shielding gas through said nozzle and a tube within said barrel extending into said nozzle for guiding said electrode through said barrel, said guiding tube being held within said header by a set screw or the like and extending from said header through said barrel into said nozzle, said guiding tube being removable through said nozzle on release of said set screw, the said gun being characterized by a tube of insulating material interposed between said extension and said guiding tube, said tube of insulating material being secured within said extension.

4. A gun for arc welding with a consumable electrode comprising a nozzle, an inner header secured to said nozzle, first tube means for guiding said electrode through said nozzle, means cooperative with said inner header for holding said guiding tube means within said nozzle so that it may be removed through said nozzle, communicating channels in said inner header for conveying cooling fluid to and away from said nozzle and shielding gas through said nozzle, a rear header in the form of a cylinder having a central and a plurality of peripheral openings therein, a second tube means for guiding said electrode mounted in said central opening, cooling fluid and gas transmitting tubes mounted in said peripheral openings, and means connecting said rear header to said nozzle so that said second guiding tube means is coextensive with said first guiding tube means and said fluid and gas tubes are coextensive with the corresponding channels in said first header.

References Cited in the file of this patent

UNITED STATES PATENTS

| 2,468,807 | Herbst | May 3, 1949 |

FOREIGN PATENTS

| 713,507 | Great Britain | Aug. 11, 1954 |
| 936,587 | Germany | Dec. 15, 1955 |